United States Patent
Slattery

[11] Patent Number: 5,919,048
[45] Date of Patent: Jul. 6, 1999

[54] ENGINE BLOCK HEATER CONNECTOR DEVICE

[76] Inventor: Billy B. Slattery, 764 Rendezvous Rd., Riverton, Wyo. 82501

[21] Appl. No.: 08/972,105

[22] Filed: Nov. 17, 1997

[51] Int. Cl.$^6$ .................................................. H01R 33/00
[52] U.S. Cl. ........................... 439/34; 307/10.1; 219/205; 361/219; 361/307
[58] Field of Search ...................................... 439/34, 142

[56] References Cited

U.S. PATENT DOCUMENTS

| | | |
|---|---|---|
| 3,270,267 | 8/1966 | Nolte, Jr. . |
| 4,708,668 | 11/1987 | Stransky .................................. 439/825 |
| 4,730,370 | 3/1988 | Elder ........................................ 27/4 |
| 4,807,895 | 2/1989 | Thomas . |
| 4,829,223 | 5/1989 | Broberg . |
| 4,971,576 | 11/1990 | Thimmesch . |
| 5,021,633 | 6/1991 | Schaefer .................................. 217/208 |
| 5,252,078 | 10/1993 | Langenbahn . |
| 5,259,930 | 11/1993 | Barker et al. .............................. 201/2 |
| 5,394,716 | 3/1995 | Dreyer ...................................... 70/276 |
| 5,697,805 | 12/1997 | Orstad et al. ............................ 439/374 |

Primary Examiner—Paula Bradley
Assistant Examiner—Cecelia Wright Brown
Attorney, Agent, or Firm—Edward Gray

[57] ABSTRACT

A device for connecting an external electrical power cord to an engine block heater in an automotive vehicle. The device is permanently mounted in the vehicle grille and includes a flanged electrical inlet whose terminals are hard-wired to the heater, and a housing which is pivotable upwardly to allow the female plug of the power cord to be connected to the inlet prongs. The original grille escutcheon is attached to the pivotable housing.

6 Claims, 2 Drawing Sheets

ENGINE BLOCK HEATER CONNECTOR DEVICE

BACKGROUND OF THE INVENTION

1. Field of the Invention

This invention relates to automotive electrical accessories for automobiles, and more particularly to a device for connecting an electrical cord delivering power to an engine block heater.

2. Description of the Related Art

In frigid climates, an engine block heater often is used to elevate and maintain the temperature of fluids in an automobile or truck engine. The heater also serves to warm the ignition coil which is contiguous to the engine. Typically, the heater includes a mounting member engageable with the engine block, and a heating element mounted on the mounting member which projects rearwardly into the block. In some arrangements the mounting member includes a threaded screw which fastens into a threaded receptacle in the engine block wall. In others the mounting member is held in place by one or several clamps. Typically, the heater remains connected to an electrical power source overnight so the engine can be readily started in the morning, even when the ambient temperature is below freezing. Opening the hood so that a power cord can be connected often is inconvenient because electrical and fuel system components and wires obstruct access to the heater. Moreover, leaving open the hood of an unattended vehicle greatly increases vulnerability to theft and vandalism, and exposes engine compartment components to frigid air as well as to possible precipitation such as snow and sleet. Having a cord permanently connected to the heater whose other end dangles out of the grille or twists around the front bumper also is undesirable because the grille and exterior paint are at risk to abrasion by the rubbing cord, and the cord distracts from the appearance of the grille and front fascia.

Devices for connecting an external power source to an electrical component within an automotive vehicle are known in the art. U.S. Pat. No. 5,538,439 to M. Fell et al. discloses a combination of an engine block heater and an electrical coupling wherein the coupling member is mounted on the block mounting member so as to project outwardly for connection to an electrical connector. The coupling member includes a sleeve surrounding a pair of connector pins extending longitudinally of the sleeve. The electrical connector includes two pins which each connect to one of the coupling member pins, surrounded by a cylindrical conector body having a sliding fit into the sleeve and held in place by a spring clip assembly.

U.S. Pat. No. 3,270,267 to A. C. Nolte, Jr. discloses a device for the slow charging of car batteries. A battery charging device within the car is attached to a conventional circuit or other current source in the user's garage to slow charge the battery. Two leads connected to the battery terminate in a male plug carried inside a housing mounted by suitable brackets in the car grille. A cover or shield having a spring is provided so that the cover is forced closed when the car is in normal use. The cover therefore appears as an integral part of the grille. When it is desired to connect an external power cord terminating in a female plug to the male plug, the cover is raised against the action of the spring.

U.S. Pat. No. 4,971,576 to J. P. Thimmesch discloses a modular electrical power cord system for use in truck engines having at least two engine block heaters. A primary cord is used in conjunction with one of several different jumper cords of appropriate length in a series or parallel configuration. Each jumper cord has a dual connector on one end of the cable that is removably connected to an end connector on the primary cord. The dual connector is also connected to one of the engine block heaters. An end connector on the opposite end of the jumper cable is removably coupled to the other engine block heater.

U.S. Pat. No. 4,829,223 to D. M. Broberg et al. discloses a cable harness to be hooked up as a permanent under-hood installation either to the storage battery or another electrical system component of an automotive vehicle without the need to raise the hood to effect connection with the cable. One end of the cable is connected to the electrical component, and the other end terminates in a polarized female plug which is secured in a convenient manner and extends outwardly of the grille. The plug is provided with a weather cap tethered on a retention cable.

U.S. Pat. No. 5,252,078 to A. Langenbahn discloses a device providing an electrical interconnection between a stationary fixture and a vehicle for the purpose of recharging batteries and the like, wherein the driver moves the vehicle forward until a plug assembly mounted on the vehicle engages a socket assembly on the fixture.

U.S. Pat. No. 4,807,895 to H. F. Thomas et al. discloses a pair of electrical terminals conveniently accessible from the exterior of an automobile or truck and connected to the vehicle's storage battery. The terminals are located within a recessed chamber formed in the vehicle body and external to the engine compartment. The chamber includes a cover door with a locking latch.

None of these references address the problem of conveniently connecting an engine block heater to an external power source while preventing damage to the block heater cord and exterior components and surfaces, and preserving esthetic appearance. What is needed is a permanently mounted connector device which is easily accessible from any vehicle's front-end, and which is permanently connected to a block heater cord permanently connected to the engine block heater.

OBJECTS OF THE INVENTION

Accordingly, it is an object of the present invention to provide a simple, convenient connector device which can be permanently mounted within the grille of an automotive vehicle.

Another object of the invention is to provide a connector device which cannot be seen when the vehicle is in normal operation, thereby preserving the vehicle's original appearance.

A further object of the invention is to provide a connector device which is reliable to operate and inexpensive to manufacture.

Other objects of the invention will become evident when the following description is considered with the accompanying drawing figures. In the figures and description, numerals indicate the various features of the invention, like numerals referring to like features throughout both the drawings and description.

SUMMARY OF THE INVENTION

These and other objects are achieved by the present invention which provides a connector device for connecting a power cord to an engine block heater of an automotive vehicle. The connector device includes a fixed first housing having a central portion with an upper flange terminating in an outer edge, and a lower flange. The connector device further includes a second housing having a central portion with a generally planar surface having an inner edge and an interior surface to which is attached a metallic plate. The first housing central portion and second housing central portion are connected by a hinge attached to the outer and inner edges so that the second housing is pivotable about the hinge. A third housing attached to the lower flange of the first housing central portion has rigidly disposed therein a push-type magnet. A flanged inlet mounted within the first housing central portion has a plurality of prongs each in electrical contact with a screw terminal. The second housing and attached escutcheon are pivotable upwardly about the hinge to expose the prongs, and pivotable downwardly until the metallic plate contacts the magnet. The connector device is permanently mounted within the vehicle grille, and each screw terminal is electrically connected to a terminal on the engine block heater.

A more complete understanding of the present invention and other objects, aspects and advantages thereof will be gained from a consideration of the following description of the preferred embodiment read in conjunction with the accompanying drawings provided herein.

DESCRIPTION OF THE PREFERRED EMBODIMENT

Figure 1:
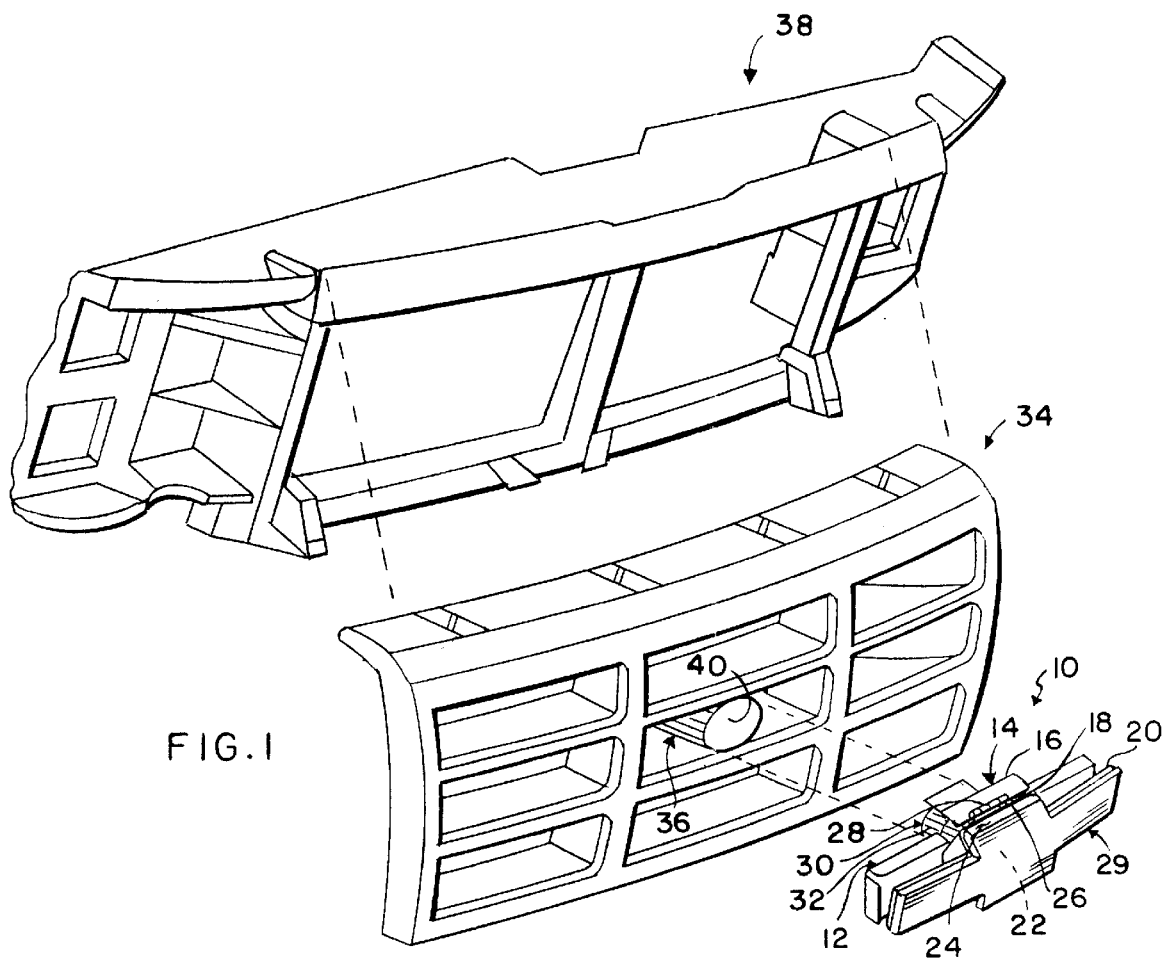
FIG. 1 is an exploded perspective view of an automobile chassis front bulkhead, an automobile grille, and a device according to the invention, rigidly mounted within the grille and including a pivotable housing attached to an escutcheon, for connecting a power cord to a heater attached to the engine block.

While the present invention is open to various modifications and alternative constructions, the preferred embodiment shown in the drawings will be described herein in detail. It is to be understood, however, there is no intention to limit the invention to the particular form disclosed. On the contrary, it is intended that the invention cover all modifications, equivalences and alternative constructions falling within the spirit and scope of the invention as expressed in the appended claims.

Where used herein, the words "connect", "connected" and "connecting" mean that the two parts referred to (e.g., a male plug and a female plug) can be readily separated after being joined together in an interlocking combination. Where used herein, the words "attach" and "attached" mean that the two parts referred to are either fabricated in a single piece, glued or bolted together, hard-wired, or joined together by a hinge. However, other forms of attachment may be suitable, consistent with simplicity of manufacture and reliability of operation.

Figure 2:
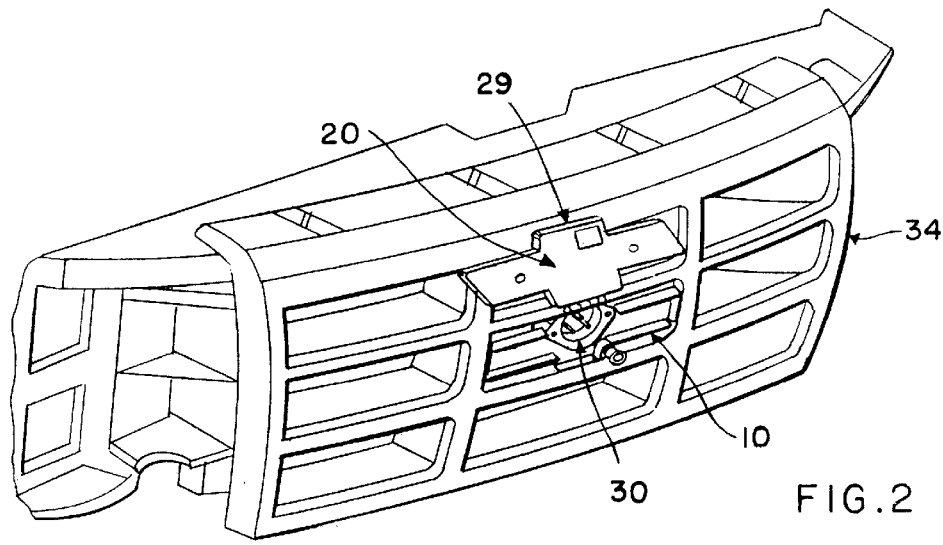
FIG. 2 is a perspective view of the FIG. 1 bulkhead, grille, and device with the housing and attached escutcheon pivoted upwardly to expose a three-prong electrical receptacle to which the power cord is connected.

Referring to FIG. 1, a connector device 10 according to a preferred embodiment of the invention includes a first housing 12 having a central portion 14 with an upper flange 16 terminating in an outer edge 18, and a second housing 20 having a central portion 22 with a generally planar upper surface 24 having an inner edge 26. First housing central portion 14 and second housing central portion 22 are connected by a hinge 28 attached to edges 18 and 26 about which the second housing 20 pivots. An escutcheon 29, originally mounted on the grille by the manufacturer, is attached to and generally congruent with the second housing 20. Connector device 10 further includes a two-pole, three-wire flanged inlet 30 having a generally cylindrical body 32. Still referring to FIG. 1, the central portion of an automobile grille 34 normally is proximate to a longitudinally disposed cylindrical member 36 having a mounting surface to which was originally attached escutcheon 29. Grille 34 is rigidly attached to a chassis front bulkhead 38. Having first removed the escutcheon 29, member 36 is bored out to create a generally cylindrical recess 40 adapted to closely receive the inlet body 32. After escutcheon 29 is attached to second housing 20, the connector device 10 is attached to the grille 34 using an epoxy cement and/or a plurality of bolts. Thus, electrical wires hard-wired or connected to inlet 30 can be conveniently dressed through bulkhead 38 into the engine compartment. FIG. 2 shows connector device 10 mounted within grille 34, with second housing 20 and attached escutcheon 29 pivoted upwardly to expose inlet 30.

Figure 3:
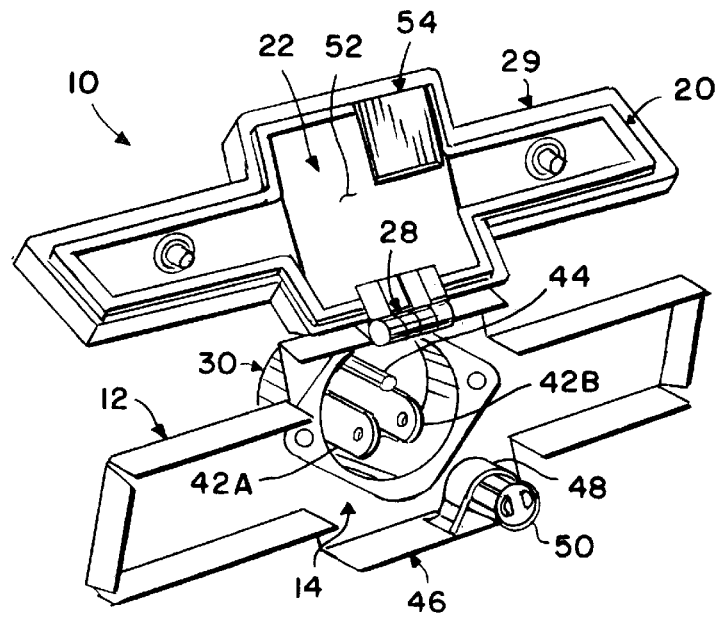
FIG. 3 is a perspective view of the device including a fixed housing, the pivotable housing and attached escutcheon, the three-prong receptacle, and a push-type, spring-loaded magnet.
Figure 4:
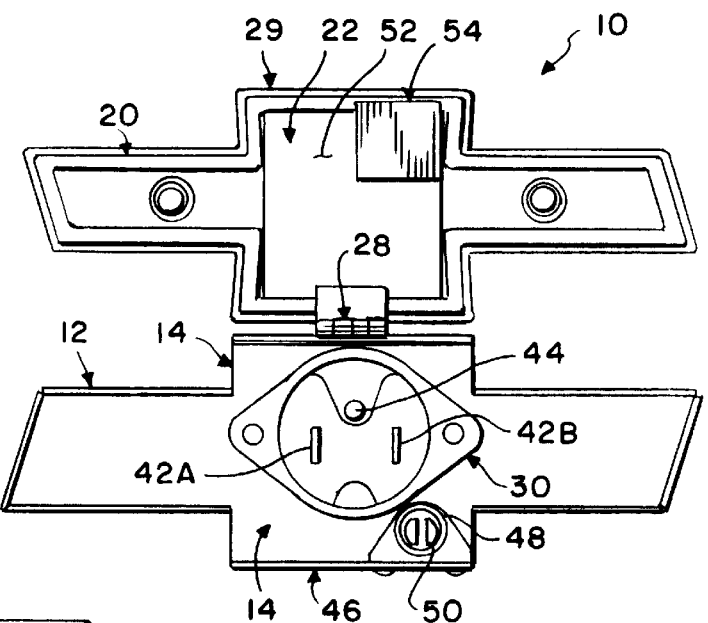
FIG. 4 is a front plan view of the FIG. 3 device.

Referring to FIGS. 3 and 4, inlet 30 mounted within central portion 14 of first housing 12 includes opposed blade-type prongs 42A, 42B and a cylindrical ground prong 44 which can be connected to the female plug of a conventional power cord when second housing 20 and attached escutcheon 29 are pivoted upwardly about hinge 28. Central portion 14 further includes a lower flange 46 to which is attached a third housing 48 wherein is disposed a generally cylindrical push-type, spring-loaded magnet 50. Central portion 22 of second housing 20 has an interior surface 52 to which is attached a metallic plate 54. When second housing 20 and attached escutcheon 29 are pivoted downwardly about the hinge 28 into a "closed" position, plate 54 contacts and is attracted by magnet 50, thus firmly securing the second housing.

Figure 5:
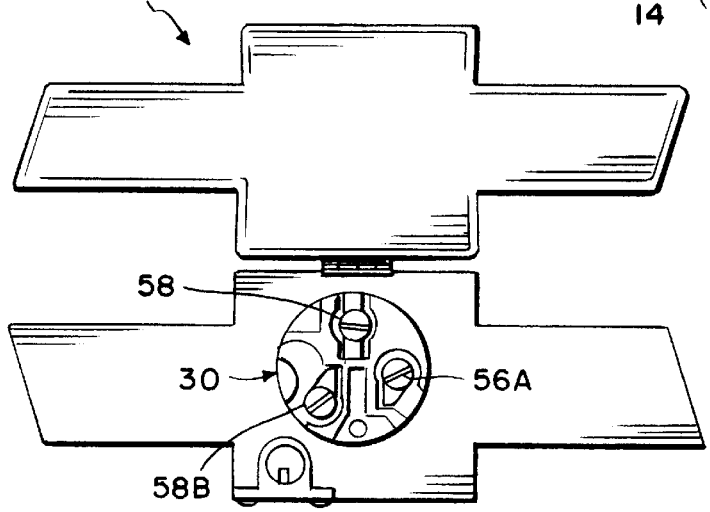
FIG. 5 is a rear plan view of the FIG. 3 device.

Referring to FIG. 5, the inlet 30 further includes three screw terminals 56A, 56B, 58 in electrical contact with, respectively, prongs 42A, 42B, 44. Preferably, the leads at one end of a three-wire electrical cord are hard-wired to the terminals 56A, 56B, 58 and the leads at the other end are hard-wired to the appropriate terminals on the engine block heater, so that the cord connecting the heater and the connector device 10 is a permanent installation.

Preferably, first housing 12 and second housing 20 are each fabricated from a thermoplastic. Alternatively, first housing 12 is fabricated from stamped aluminum sheeting and second housing 20 is fabricated from a thermoplastic. Preferably, flanged inlet 30 is part number 5278-C manufactured by Leviton Corporation of Bronx, N.Y. Preferably, magnet 50 is part number TL-4 manufactured by Cookson Magnet, Inc. of Warrington, Pa.

What is claimed is:

1. A connector device for connecting a power cord to an engine block heater, comprising:

a first housing having a central portion with an upper flange terminating in an outer edge, and a lower flange;

a second housing having a central portion with a generally planar upper surface having an inner edge, said central portion having an interior surface to which is attached a metallic plate, the first housing central portion and second housing central portion connected by a hinge attached to said outer and inner edges, the second housing pivotable about the hinge;

a flanged inlet mounted within the first housing central portion, having a plurality of prongs each in electrical contact with one of a plurality of screw terminals; and a third housing attached to the lower flange of the first housing central portion, wherein is rigidly disposed a push-type magnet.

2. The connector device of claim 1, wherein an escutcheon is attached to the second housing.

3. The connector device of claim 2, wherein the escutcheon is provided by the vehicle manufacturer.

4. The connector device of claim 3, wherein the second housing and attached escutcheon are pivotable upwardly about the hinge to expose the plurality of prongs, and pivotable downwardly about the hinge until the metallic plate contacts the magnet.

5. The connector device of claim 4, wherein the device is permanently mounted within the grille of an automotive vehicle, and each screw terminal is electrically connected to a terminal on an engine block heater.

6. The connector device of claim 5, wherein said plurality of prongs and screw terminals is three.

* * * * *